April 16, 1968  R. T. HUCKS, JR  3,377,659

APPARATUS FOR FORMING A BELL END ON PLASTIC PIPE

Filed Oct. 15, 1965

INVENTOR.
ROBERT TYLER HUCKS, JR
BY
John A. McKinney
ATTORNEY

United States Patent Office 3,377,659
Patented Apr. 16, 1968

3,377,659
APPARATUS FOR FORMING A BELL END ON PLASTIC PIPE
Robert T. Hucks, Jr., Somerville, N.J., assignor to Johns-Manville Corporation, New York, N.Y., a corporation of New York
Filed Oct. 15, 1965, Ser. No. 496,467
5 Claims. (Cl. 18—19)

ABSTRACT OF THE DISCLOSURE

Apparatus for forming a bell end with an internal circumferential groove on a plastic pipe utilizing a die having a plurality of members constructed for relative movement generally in an axial direction. One of the die members comprises a continuous annular ring for forming a smooth-walled groove in the bell end.

---

This invention relates to the forming of a bell end on a plastic pipe and particularly to the forming of a bell end having an annular groove in its inner surface which groove is adapted to receive an annular resilient gasket. In the preferred embodiment, the bell end is formed from an end portion of a plastic pipe which end portion has been provided with a radial wall thickness greater than the radial wall thickness of the remaining portions of the pipe.

One of the most advantageous methods of joining adjacent sections of plastic pipe is to provide a bell end on the plastic pipe. Adjacent pipes are then joined by inserting the plain end of one pipe into the bell end of the other. The fluid seal for such a joint preferably comprises an annular resilient gasket seated in an annular groove formed in the inner surface of the bell end and urged into sealing engagement by the compressive forces applied thereto as the pipe end is inserted into the bell end. Since the most common method for forming plastic pipe is by extrusion, it is necessary to form the bell end on the pipe after the pipe has been extruded.

The primary object of the instant invention is to provide an apparatus for forming a bell end on plastic pipe which bell end has an annular groove in its inner surface.

The foregoing object is accomplished in accordance with the instant invention by providing a die having an outer configuration corresponding to the predetermined inner configuration for the bell end. A plastic pipe having an end portion having a wall thickness greater than the wall thickness of the other portions of the pipe is positioned adjacent the die. This end portion which has been raised to a temperature greater than ambient is forced over the die. Since the tendency of the plastic pipe while heated is to return to its original configuration, the plastic pipe will conform to the outer surface of the die. The pipe is cooled while in conformation with the outer surface of the die to form a bell end of the desired configuration. The bell end of the pipe is then pulled from the die. The bell end formed in this manner has a wall thickness at least equal to and preferably greater than the wall thickness of the other portions of the pipe.

Figure 1:
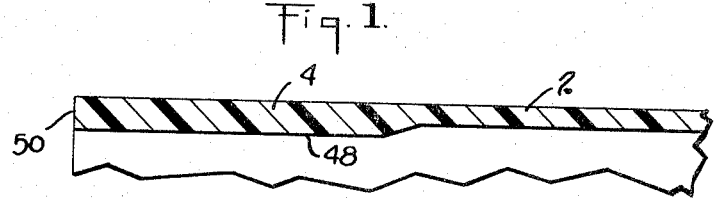
Figure 2:
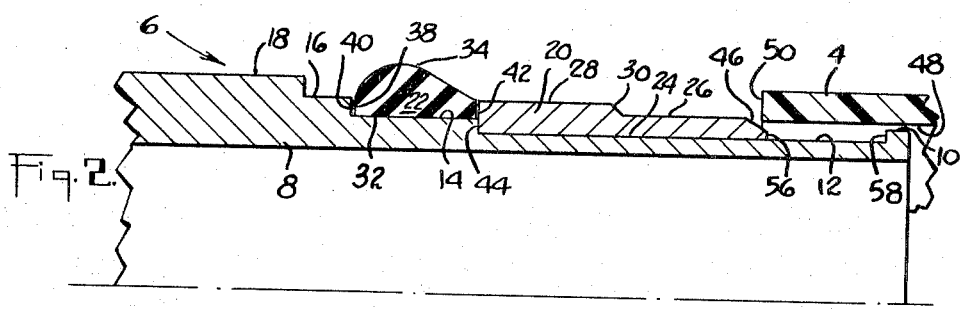
Figure 3:
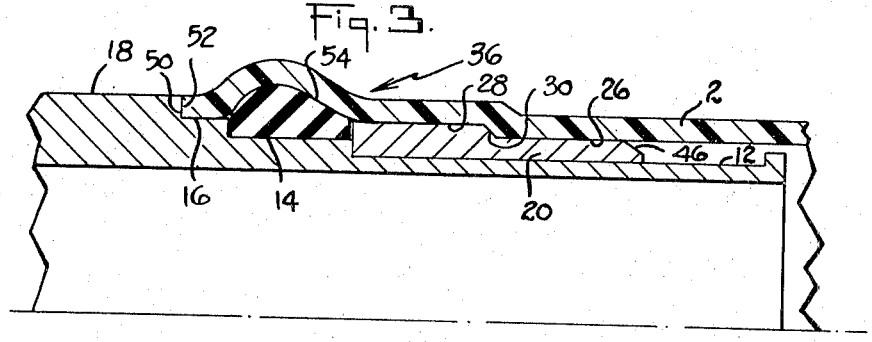
Figure 4:
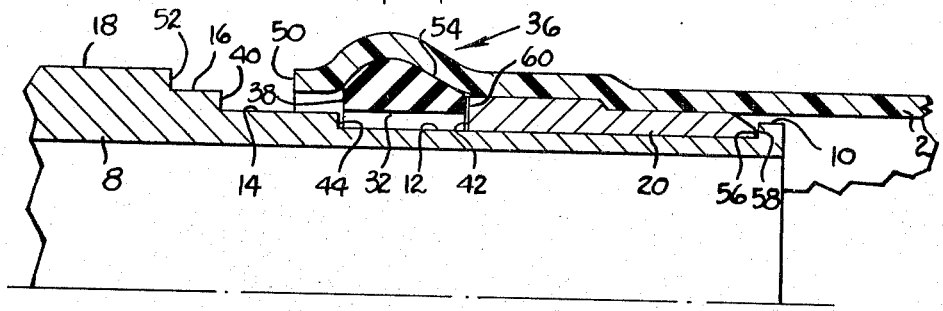

The invention will be more fully understood and further objects and advantages thereof will become more apparent when reference is made to the following detailed description of a preferred embodiment of the invention and the accompanying drawings in which:

FIG. 1 is a view in axial cross-section of part of a plastic pipe and illustrating particularly the end portion thereof; and FIGS. 2–4, inclusive, are views in axial cross-section of part of the die of the instant invention and illustrate the various stages of a method for forming the end portion into a bell end for the plastic pipe.

Referring to the drawings, there is illustrated in FIG. 1 a plastic pipe 2 having an end portion 4 having a radial wall thickness substantially greater than the radial wall thickness of the other portions of the plastic pipe. The end portion 4 is heated by any suitable mechanism to a temperature throughout the wall thickness of the end portion substantially greater than ambient. After being heated, the end portion, as illustrated in FIG. 2, is placed over the axial extremity of a die 6 so that the end portion 4 may be moved over the die for a purpose to be described below.

The die 6 comprises a tubular body 8 having an outer surface defined by a plurality of generally cylindrical sections 10, 12, 14, 16 and 18 of differing diameters, a member 20 mounted for sliding movement relative to the body 8, and a continuous annular ring 22. The member 20 has a generally cylindrical inner surface 24 having a diameter slightly greater than the diameter of the generally cylindrical surface 12. The outer surface of the member 20 is provided with two generally cylindrical surfaces 26 and 28 of differing diameters joined by a slanted shoulder 30. The configuration presented by the surfaces 26 and 28 and the shoulder 30 corresponds to the predetermined inner configuration for that portion of the bell end to be formed from the end portion 4. The annular ring 22 has a generally cylindrical inner surface 32 having a diameter slightly greater than the diameter of the generally cylindrical surface 14. The outer surface 34 of the continuous annular ring 22 has a configuration corresponding to the predetermined configuration of the groove to be formed in the inner surface of the bell end. Also, it is noted that the surfaces 34 and 28 blend together to provide a smooth transition for the end portion 4 as it moves from the surface 28 to the surface 34 as described below. The generally cylindrical surface 16 has a configuration corresponding to the predetermined configuration of the portion of the bell end between the annular groove and the axial extremity of the bell end of the pipe. The generally cylindrical surface 10 has a diameter greater than the diameter of the inner surface 24 of the member 20 but less than the diameter of the outer surface 26 thereof for a purpose to be described.

The operation of the apparatus is described in relation to FIGS. 2–4, inclusive which illustrates the various stages during the formation of the end portion 4 into a bell end 36. The initial position of the various elements is illustrated in FIG. 2 which shows the annular ring 22 seated on the generally cylindrical surface 14 with the leading edge 38 thereof in contact with the shoulder 40 between the generally cylindrical sections 14 and 16. The member 20 is positioned over the generally cylindrical section 12 and because of the slight difference in diameters, the member 20 may be moved over the cylindrical section 12. As illustrated in FIG. 2, the leading edge 42 of the member 20 has been positioned in contact with the shoulder 44 between the generally cylindrical sections 12 and 14. The thickened end portion 4 at a temperature substantially greater than ambient has been moved over the generally cylindrical section 10 and is in contact with the tapered edge 46 of the member 20. The inner diameter 48 of the thickened end portion 4 is greater than the diameter of the generally cylindrical section 10 but less than the diameter of the generally cylindrical surface 26 so as to insure that it may move over the section 10 and into contact with the tapered edge 46.

After the end portion 4 has contacted the tapered edge 46, sufficient force is applied to the pipe 2 to move the end portion over the outer surface of the die 6. The end portion 4 has been raised to a temperature substantially greater than ambient and this functions to increase the plasticity of the material in the end portion 4 so that it may be readily moved over the surfaces of the die. Also, the inherent characteristics of the material in the end portion 4 are such that it has a tendency to resist expansion so as to remain in contact with the surfaces of the die 6. As illustrated in FIG. 3, the end portion 4 is moved over the die 6 until the axial extremity 50 thereof contacts the shoulder 52 between the generally cylindrical sections 16 and 18. The end portion 4 is retained in this position and cooled so as to impart a permanent set to the material in the end portion while in position over the die 6 so as to form the bell end 36 having a groove 54 in the inner surface thereof which is adapted to receive an annular resilient sealing gasket. It is readily apparent in FIGS. 3 and 4 that the end portion 4 has been formed into a bell end having an inner configuration corresponding to the outer surfaces of the die 6 as defined by the surfaces 26, 30, 28, 34 and 16. Also, since the end portion 4 has been increased in diameter to form the bell end, it is noted that the radial wall thickness of the bell end 36 is at least as great and preferably greater than the radial wall thickness of the remaining portions of the pipe 2. The diameter of the generally cylindrical surface 26 is substantially the same as the inner diameter of the plastic pipe 2.

After the bell end 36 has been formed and permanently set, a force is applied to the pipe 2 to move the bell end 36, the annular ring 22 and the member 20 toward the generally cylindrical section 10, as illustrated in FIG. 4. The member 20 will be moved over the generally cylindrical section 12 until the axial extremity 56 of the member 20 contacts the shoulder 58 between the generally cylindrical sections 10 and 12. Sufficient force is applied to the pipe 2 to continue the movement thereof, but the leading edge 42 of the member 20 contacts the surface 60 of the annular ring 22 so as to dislodge the annular ring 22 from the groove 54. The force applied to the pipe functions to apply a force to the annular ring 22 causing it to be deformed and moved into the space between the leading edge 42 of the member 20 and the shoulder 44, illustrated in FIG. 4 as being vacant. The annular ring 22 comprises a material having sufficient rigidity to form the groove 54 in the bell end 36 but having sufficient elasticity so that it may be deformed to allow the bell end to be removed from the die 6. After the bell end 36 has been removed, the annular ring 22 is again seated on the generally cylindrical section 14 so that the end portion 4 of another plastic pipe can be formed into a bell end 36.

The invention is particularly applicable to the forming of a bell end on plastic pipe of the type comprising a poly(vinyl chloride) material. However, it is understood that pipes comprising other types of material such as polyethylene, acrylonitrile butadiene styrene, and other similar materials may also be provided with bell ends in the manner set forth in the instant invention. The annular ring 22 preferably comprises a silicone rubber material such as that marketed by Dow Corning Corporation under the trade designation No. 601 Silastic RTV but other materials such as natural rubber, polyurethane elastomers and other similar materials may be employed so long as the material has sufficient rigidity to resist deformation by the material in the end portion as it is formed into the bell end and sufficient plasticity to allow it to be deformed into the space between the leading edge 22 of the member 20 and the shoulder 44. The material must also resist the heat transferred to it from the end portion of the plastic pipe during the formation of the bell end. The member 20 and the tubular body 8 preferably are metallic such as steel and may be provided with heating means to maintain the end portion 4 at its elevated temperature while it is being moved over the outer surface of the die. However, if so provided, the die must also contain cooling means to impart the permanent set to the formed bell end.

Apparatus of the type described in the instant application was utilized to form a bell end on a plastic pipe 2 comprising a poly(vinyl chloride) material and having an outside diameter of 2.37 inches where the radial wall thickness of the end portion 4 was 0.17 inch. The end portion 4 was heated to a temperature of about 280° F. and was pushed over the die 6 and formed into a bell end having an inner diameter adjacent its open axial extremity of 2.40 inches. The continuous annular rings 22 comprised a silicon rubber material and formed a groove 54 in the bell end 36. The annular ring 22 was an integral member continuous in both the longitudinal and circumferential directions. The foregoing dimensions are given for illustration purposes only and the invention is not to be limited thereto. The invention, as explained above, is applicable to forming bell ends in pipes comprising other materials and other dimensions.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for forming a bell end of predetermined inner configuration in a plastic pipe including an annular groove in the inner surface thereof and wherein the end portion of the plastic pipe has been raised to a temperature substantially greater than ambient comprising:

(a) a die having a plurality of relatively movable members which when in operative position have an outer configuration generally corresponding to the predetermined inner configuration for the bell end of the plastic pipe and wherein said members move generally in an axial direction, (b) one of said movable members comprising a continuous annular ring having an outer configuration corresponding to the groove to be formed in said bell end, (c) means for holding said continuous annular ring in a position in said die for forming said groove in said bell end as said plastic pipe is moved into position over said die, and (d) means for removing said continuous annular ring from said groove formed in said bell end as said bell end is removed from said die.

2. Apparatus as defined in claim 1 wherein said annular ring comprises:

(a) an elastomeric material.

3. Apparatus as defined in claim 1 wherein:

(a) said outer configuration of said die has a diameter greater than the outer diameter of said end portion.

4. Apparatus as defined in claim 1 wherein said die further comprises:

(a) a tubular body having an outer surface defined by a plurality of generally cylindrical sections of differing diameters, (b) a second of said movable members having a generally cylindrical inner surface having a diameter slightly greater than the first of said generally cylindrical sections, (c) said second movable member extending in an axial direction for a distance less than the axial extent of said first of said generally cylindrical sections and positioned for sliding movement over the outer surface of said first of said generally cylindrical sections, (d) said continuous annular ring having a generally cylindrical inner surface having a diameter slightly greater than the second of said generally cylindrical sections, (e) said second generally cylindrical section having a diameter greater than the diameter of said first of said generally cylindrical sections, and (f) said first movable member having an outer surface having a diameter greater than the diameter of said generally cylindrical inner surface of said continuous annular ring.

5. Apparatus as defined in claim 4 and further comprising:
  (a) a third of said generally cylindrical sections having an outside diameter greater than the outside diameter of said first of said generally cylindrical sections, and
  (b) said first of said generally cylindrical sections being located axially between said second and said third of said generally cylindrical sections and cooperating with said second of said movable members to remove said continuous annular ring from said groove as said bell end is removed from said die.

References Cited

UNITED STATES PATENTS

| | | |
|---|---|---|
| 2,672,175 | 3/1954 | Howard. |
| 3,201,844 | 8/1965 | Poitras _____ 18—19 |
| 3,205,535 | 9/1965 | Niessner et al. _____ 18—19 X |
| 3,248,756 | 3/1966 | Mills et al. _____ 18—19 |

WILLIAM J. STEPHENSON, *Primary Examiner.*